(12) United States Patent
Carter-Patterson et al.

(10) Patent No.: US 8,021,733 B2
(45) Date of Patent: Sep. 20, 2011

(54) DISPOSABLE BATH MAT

(76) Inventors: Renee Carter-Patterson, Hilliard, OH (US); Pamela Gergal, Hilliard, OH (US)

( * ) Notice: Subject to any disclaimer, the term of this patent is extended or adjusted under 35 U.S.C. 154(b) by 321 days.

(21) Appl. No.: 12/241,651

(22) Filed: Sep. 30, 2008

(65) Prior Publication Data
US 2010/0081002 A1   Apr. 1, 2010

(51) Int. Cl.
*B32B 3/00* (2006.01)
(52) U.S. Cl. .................. 428/64.1; 428/80; 4/582; 4/583
(58) Field of Classification Search .................. 428/64.1, 428/80; 4/581–583
See application file for complete search history.

(56) References Cited

U.S. PATENT DOCUMENTS

| | | | | |
|---|---|---|---|---|
| 1,533,973 A | * | 4/1925 | Cohen et al. | 5/484 |
| 5,293,660 A | * | 3/1994 | Park | 15/160 |
| 6,245,697 B1 | * | 6/2001 | Conrad et al. | 442/370 |
| 6,537,298 B2 | * | 3/2003 | Dedo | 606/203 |

* cited by examiner

*Primary Examiner* — Alexander Thomas
(74) *Attorney, Agent, or Firm* — Jerry D. Haynes; The Law Office of Jerry D. Haynes

(57) ABSTRACT

Disclosed is a disposable bath mat for use in bath facilities, such as bathtubs and shower stalls. The disposable bath mat comprises a top layer and a bottom layer coupled to a bottom surface of the top layer. The top layer is composed of a biodegradable material and the bottom layer is composed of a slip-resistant material.

4 Claims, 4 Drawing Sheets

DISPOSABLE BATH MAT

FIELD OF THE INVENTION

The present invention relates generally to an article for use in bath facilities such as bathtubs and shower stalls, and, more particularly, to a disposable bath mat utilized by a user during bathing such that the disposable bath mat is capable of ensuring hygiene and safety of the user.

BACKGROUND OF THE INVENTION

Use of a bath mat in the bath facilities, such as bathtubs and shower stalls, at a private place or a public place is well known in the art. However, such bath mats are more likely to be associated with hygiene related problems, such as accumulation of dirt and germs on the bath mats, due to use by a plurality of people. Moreover, an extended use of such bath mats may cause a growth of fungus and bacteria thereon, which may produce an unpleasant odor. Additionally, the use of such bath mats may cause spreading of germs during an extended use thereof.

Another concern while using the bath mats is a risk of slipping and falling. Specifically, bathtubs and floors of shower stalls may be slippery due to use of water in the area surrounding the bathtubs and the shower stalls. A bath mat positioned on the bath tub or the floor of the shower stall may slip when a user steps on the bath mat, thereby causing an injury to the user.

Accordingly, there exists a need for a disposable bath mat for use in bath facilities, such as bathtubs and shower stalls, which avoids hygiene related problems that may occur due to an extended use of the bath mat. Additionally, there exists a need for a disposable bath mat which is capable of avoiding slippage by a user while using the bath mat at bath facilities.

SUMMARY OF THE INVENTION

In view of the foregoing disadvantages inherent in the prior art, the general purpose of the present invention is to provide a disposable bath mat, configured to include all the advantages of the prior art, and to overcome the drawbacks inherent therein.

Accordingly, an object of the present invention is to provide a disposable bath mat for use by a user at bath facilities such as bath tubs and shower stalls during and after bathing, such that the disposable bath mat ensures hygiene of the user.

Another object of the present invention is to provide a disposable bath mat which ensures safety by a user by avoiding a risk of slippage of the user while using the disposable bath mat in bath facilities.

In light of the above objects, in one aspect of the present invention, a disposable bath mat is disclosed. The disposable bath mat comprises a top layer and a bottom layer coupled to a bottom surface of the top layer. The top layer is composed of a biodegradable material and the bottom layer is composed of a slip-resistant material.

In another aspect of the present invention, the disposable bath mat further includes a waterproof lining coupled to a top surface of the top layer of the disposable bath mat.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing, in which:

Like reference numerals refer to like parts throughout the description of several views of the drawings.

DETAILED DESCRIPTION OF THE INVENTION

The exemplary embodiments described herein detail for illustrative purposes are subject to many variations in implementation thereof. It should be emphasized, however, that the present invention is not limited to a disposable bath mat, as shown and described. It is understood that various omissions and substitutions of equivalents are contemplated as circumstances may suggest or render expedient, but these are intended to cover the application or implementation without departing from the spirit or scope of the claims of the present invention.

The terms "a" and "an" herein do not denote a limitation of quantity, but rather denote the presence of at least one of the referenced item.

The present invention provides a disposable bath mat for used in bath facilities, such as bathtubs and shower stalls. The disposable bath mat is capable of providing a hygienic and safe environment for bathing. The term 'environment' used herein refers to portion of a bath facility, such as a floor of the shower stall and a bathtub-floor, used by a user while bathing.

Figure 1A:
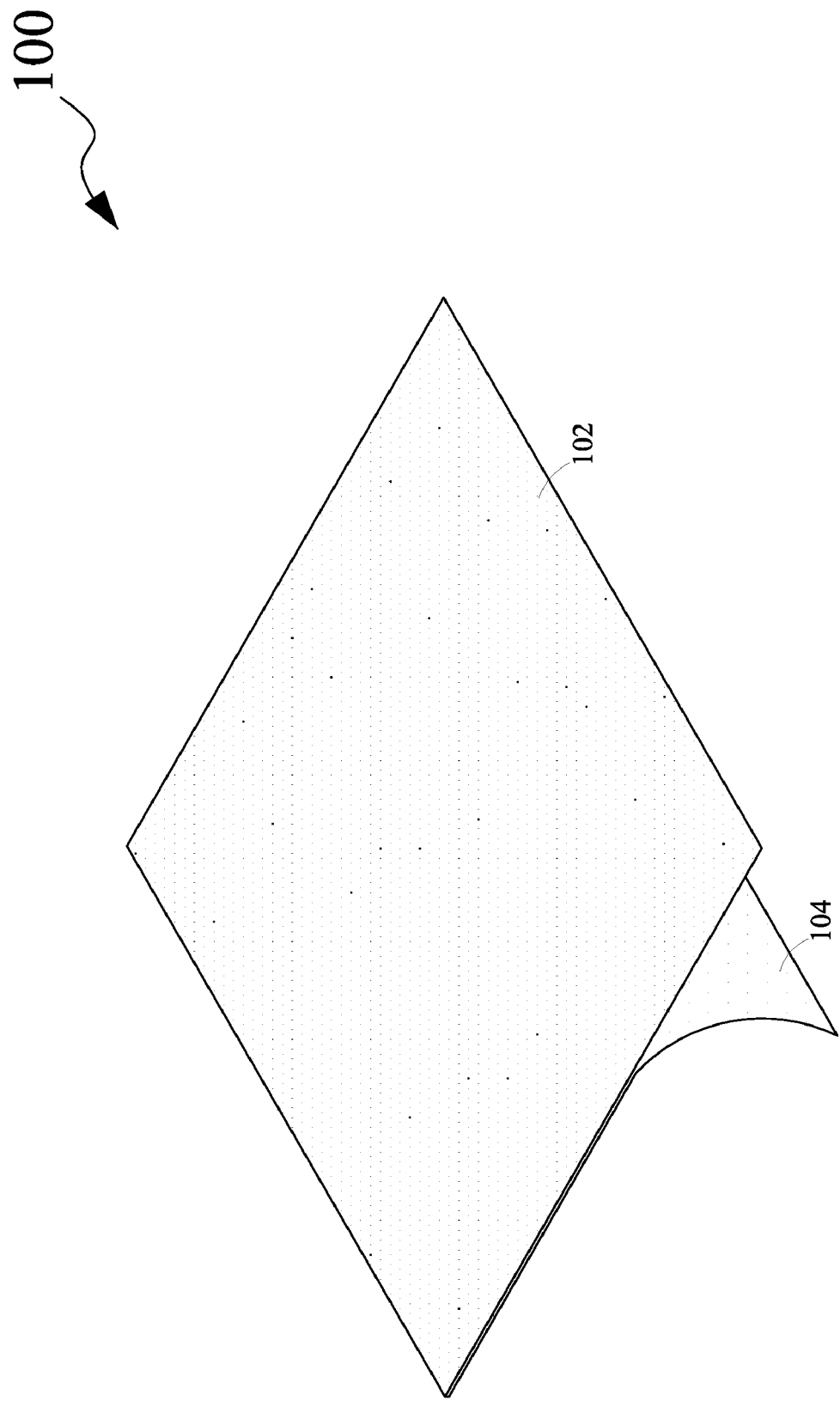
FIG. 1A illustrates a perspective view of a disposable bath mat, in accordance with an exemplary embodiment of the present invention.

Referring now to FIG. 1A, a perspective view of a disposable bath mat 100 is illustrated, in accordance with an exemplary embodiment of the present invention. The disposable bath mat 100 includes a top layer 102 and a bottom layer 104 coupled to a bottom surface (not shown) of the top layer 102.

The top layer 102 is composed of a biodegradable material. In one embodiment of the present invention, the biodegradable material includes a blend of a paper material, a nylon material, and a cotton material. The biodegradable composition of the top layer 102 enables the top layer 102 to get easily decomposed after the use of disposable bath mat 100. Further, the bottom surface of the top layer 102 is adapted to receive the bottom layer 104 thereon.

Specifically, the bottom layer 104 is coupled to the bottom surface of the top layer 102 by utilizing conventional coupling methods, such as by sewing the top layer to the bottom layer, by adhering the top layer to the bottom layer by using adhesives and any other coupling method known in the art. The bottom layer 104 is composed of a slip-resistant material. In one embodiment of the present invention, the slip-resistant material is a rubber material. Further, the slip-resistant material may be a biodegradable material, such that the bottom layer 104 also gets easily decomposed after the use of disposable bath mat 100. The slip-resistant material of the bottom layer 104 enables the disposable bath mat 100 to provide a substantial friction for avoiding a risk of slippage by a user utilizing the disposable bath mat 100 in the bath facility.

Figure 1B:
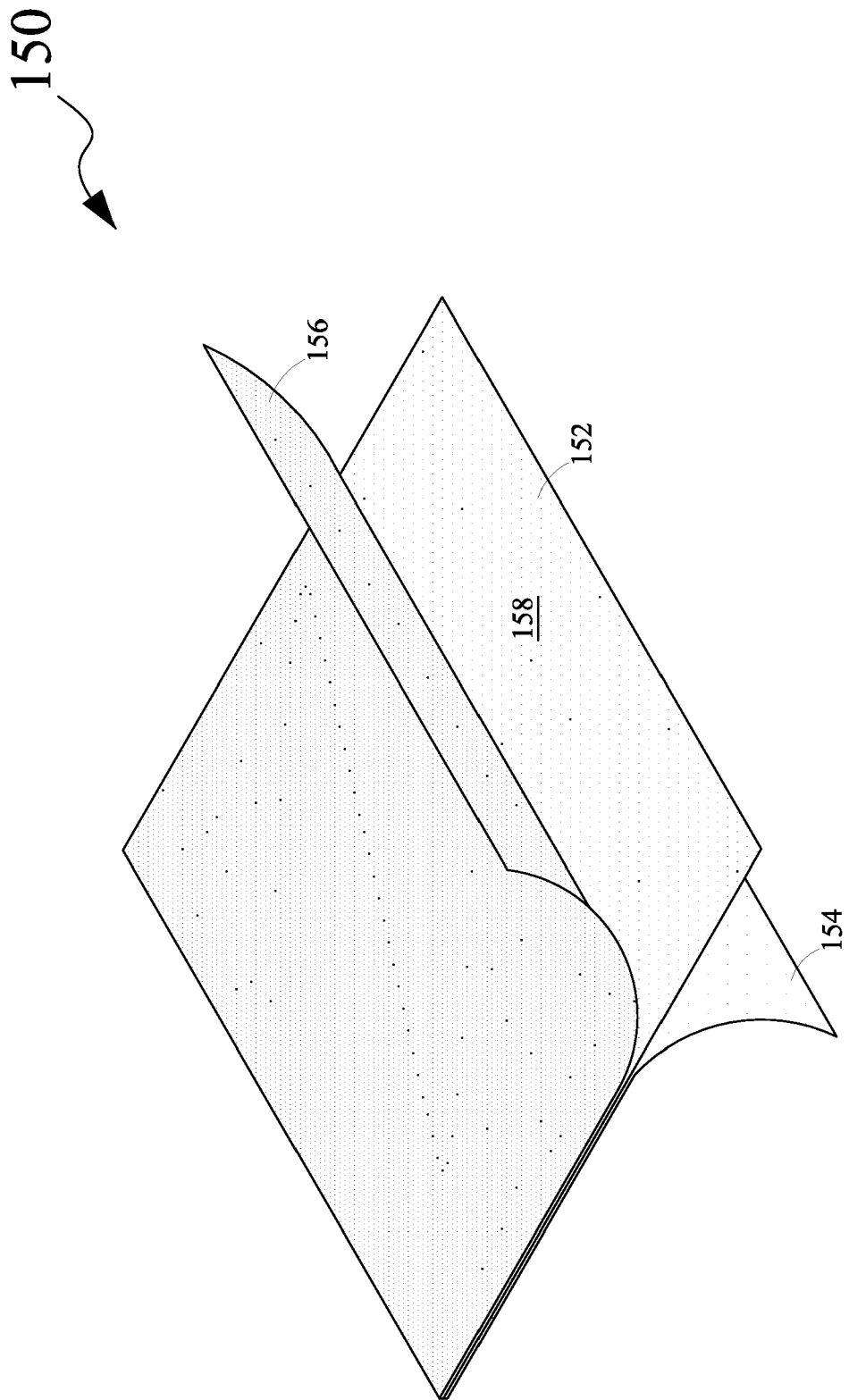
FIG. 1B illustrates a perspective view of a disposable bath mat, in accordance with another exemplary embodiment of the present invention.

Further, the disposable bath mat, as disclosed herein, may include a water proof lining coupled to the top layer thereof. Specifically, FIG. 1B illustrates a disposable bath mat 150 having a top layer 152, a bottom layer 154 and a waterproof lining 156 coupled to a top surface 158 of the top layer 152. The top layer 152 and the bottom layer 154 of the disposable bath mat 150 may be configurationally and functionally similar to the top layer 102 and the bottom layer 104, respectively, of the disposable bath mat 100.

Further, the disclosed disposable bath mat, such as the disposable bath mat 100 and the disposable bath mat 150, may be configured in a variety of shapes. In one embodiment of the present invention, the disclosed disposable bath mats, such as the bath mat 100 and the bath mat 150, may be configured to assume a square shape, as shown in FIG. 1A. More specifically, both the top layer 102 and the bottom layer 104 of the disposable bath mat 100 are configured to assume the square shape such that the top layer 102 and the bottom layer 104 confronts each other. Further, referring to FIG. 1B, the top layer 152, the bottom layer 154 and the water proof lining 156 are configured to assume the square shape such that the water proof lining 156 confronts the top layer 152. It will be, however, evident to a person skilled in the art that the disposable bath mat, such as the disposable bath mat 100 and the disposable bath mat 150, may be configured to have any other shape, such as a circular shape, an elliptical shape or any other polygonal shape. A disposable bath mat having a different shape has been described in conjunction with FIG. 2.

In an exemplary embodiment of the present invention, the disposable bath mat 100 and the disposable bath mat 150 may be configured to have a length of about 24 inches (in), a width of about 24 in, and a thickness of about ½ in to 1 in.

Figure 2:
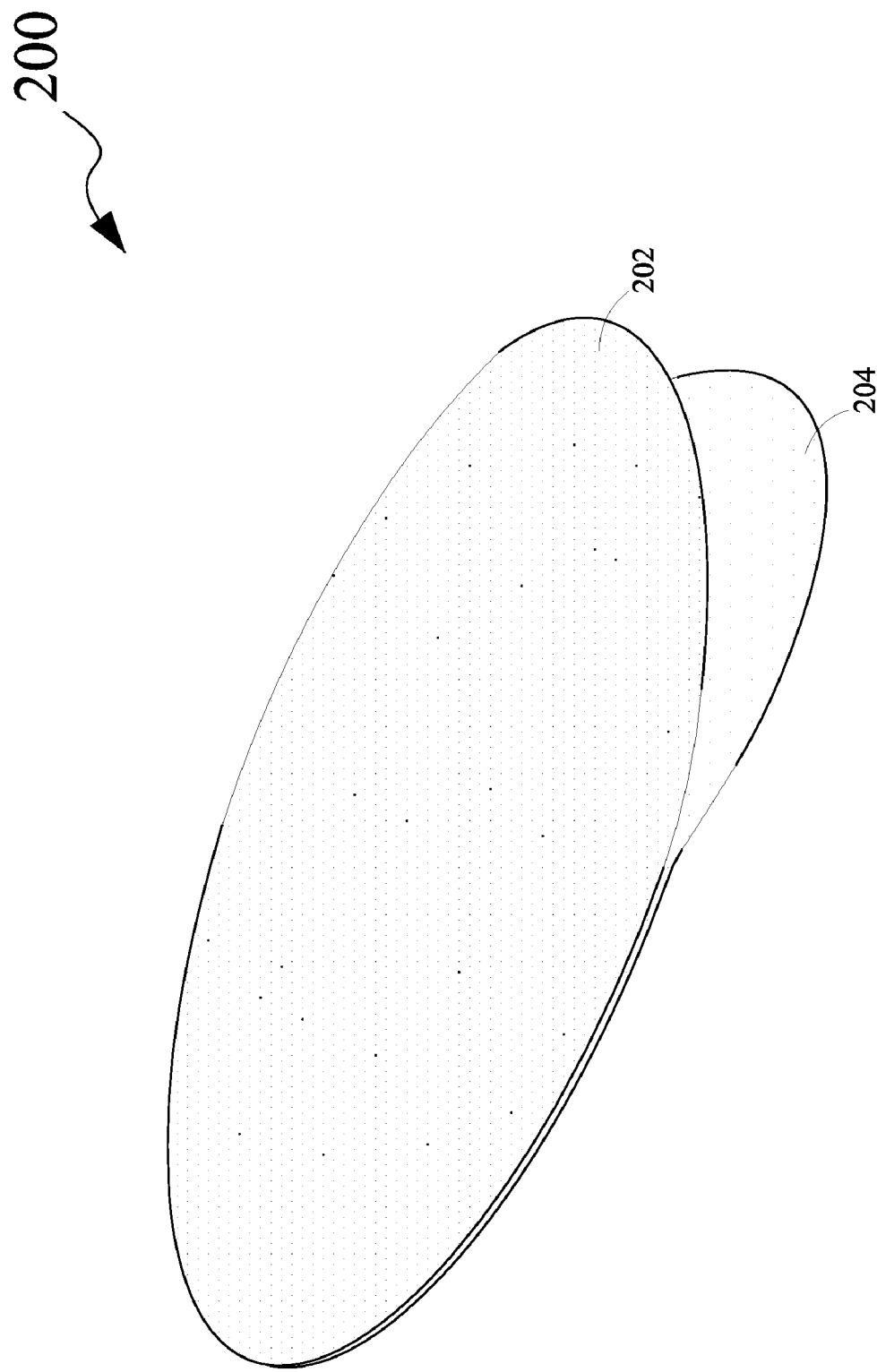
FIG. 2 illustrates a perspective view of a disposable bath mat, in accordance with yet another embodiment of the present invention.

Referring now to FIG. 2, a perspective view of a disposable bath mat 200 is illustrated, in accordance with yet another embodiment of the present invention. The disposable bath mat 200 is configurationally similar to the disposable bath mat 100 except that the disposable mat 200 is configured to have an elliptical shape, as shown in FIG. 2. Specifically, the disposable bath mat 200 includes elements similar to that of the disposable bath mat 100, such as a top layer 202, and a bottom layer 204. The bottom layer 204 is coupled to a bottom surface (not shown) of the top layer 202. Further, the top layer 202 of the disposable bath mat 200 is composed of a biodegradable material, and the bottom layer 204 of the disposable bath mat 200 is composed of a slip-resistant material. Moreover, the biodegradable material may include a blend of a paper material, a nylon material, and a cotton material, and the slip-resistant material may be a rubber material.

The top layer 202 and the bottom layer 204 of the disposable bath mat 200 are configured to assume the elliptical shape, such that the top layer 202 and the bottom layer 204 confront each other to configure the disposable bath mat 200. In an embodiment of the present invention, the disposable bath mat 200 may be configured to have a major diameter of about 34 in, a minor diameter of about 15 in, and a thickness of about ½ in to 1 in.

The disposable bath mat, such as the disposable mat 100, 150 and 200, of the present invention is configured to be preferably used in a bathtub while taking a bath. More specifically, the disclosed disposable bath mat is adapted to be placed on a bathtub-floor for covering the bathtub-floor, thereby providing hygienic and safe environment for taking bath in the bathtub. Further, the disclosed disposable bath mat is configured to be used in a shower stall while taking a shower. More specifically, the disposable bath mat is adapted to be placed on a floor of the shower stall for covering the floor, thereby providing hygienic and safe environment for taking shower in the shower stall. The utilization of the disclosed disposable bath mat is further explained in detail in conjunction with FIG. 3.

Figure 3:
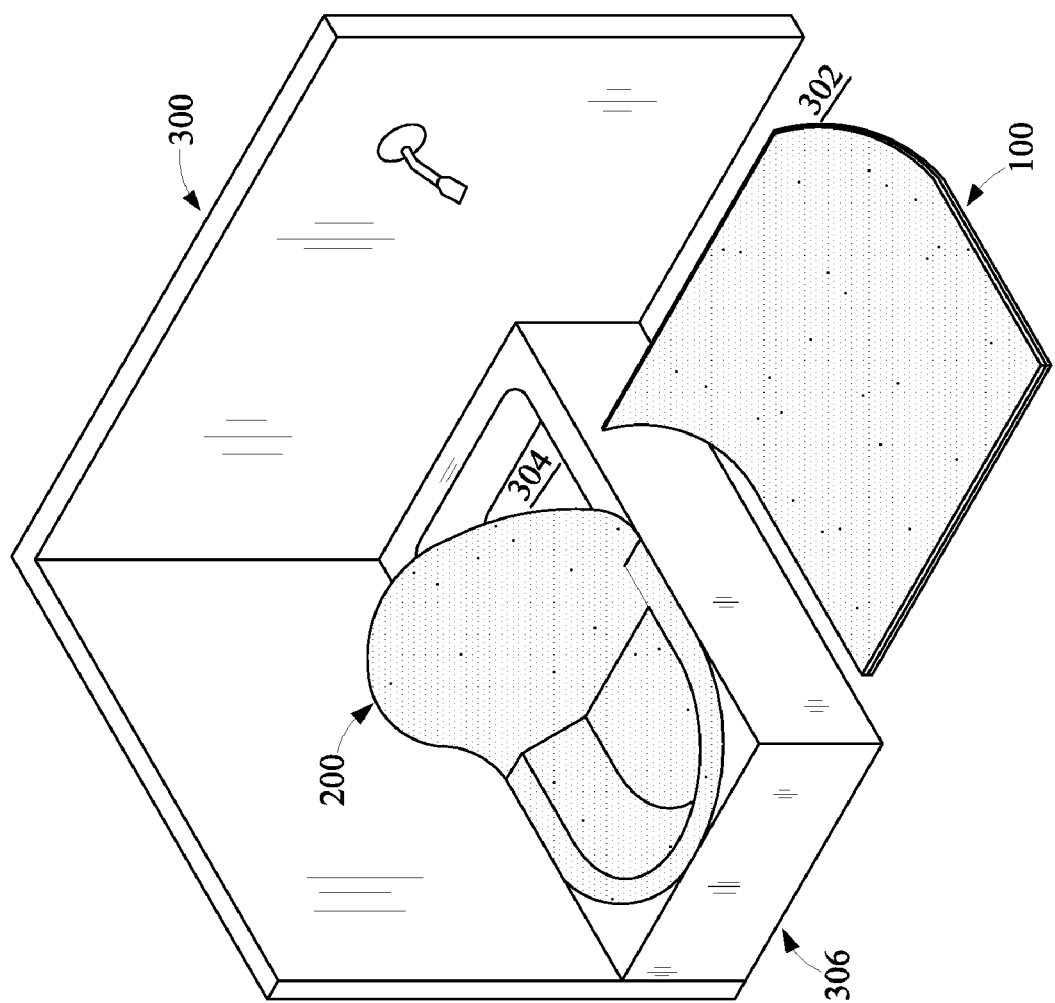
FIG. 3 illustrates an environment in which the disposable bath mats of FIGS. 1A, and 2 are utilized.

Referring now to FIG. 3, an environment in which the disposable bath mats, such as the bath mats 100 and 200, are utilized is illustrated. Specifically, FIG. 3 illustrates the disposable bath mats, such as the disposable mats 100 and 200 being utilized in a shower stall 300.

More specifically, the disposable bath mat 100 is adapted to be placed on a floor 302 of a shower stall 300 for partially covering the floor 302. In use, the disposable bath mat 100 is capable of being disposed on the floor 302 of the shower stall 300 in a manner such that disposable bath mat 100 substantially covers the floor 302, thereby providing hygienic and safe environment to the user for taking a shower in the shower stall 300. It will be evident to a person skilled in the art that the disposable mat 150 and the disposable mat 200 may also be utilized in a similar manner for covering the floor 302 of the shower stall 300.

Further, as shown in FIG. 3, the disposable bath mat 200 is adapted to be placed on a bathtub-floor 304 of a bathtub 306 for partially covering the bathtub-floor 304. In use, the disposable bath mat 200 is capable of being disposed on the bathtub-floor 304 in a manner such that the disposable bath mat 200 substantially covers the bathtub-floor 304, thereby providing hygienic and safe environment to the user for taking a bath in the bathtub 306. It will be evident to a person skilled in the art that the disposable bath mat 100 and the disposable bath mat 150 may also be utilized in a manner, as described above, for covering the bathtub-floor 304.

Further, as described, the disposable bath mat of the present invention may be configured to assume other shapes apart from the square shape and the elliptical shape. In an embodiment of the present invention, the disposable bath mat of the present invention is configured to assume a rectangular shape having a length of about 38 in, a width of about 20 in, and a thickness of about ½ in to 1 in.

The disposable bath mats, as explained herein, enable in providing a hypoallergenic bath mat which may be disposed after the use thereof. Specifically, the disposable bath mats of the present invention provide a non-allergic and a soft-touch experience to a user using the disposable bath mats. Further, the disposable bath mats may be packaged in a clear enclosure and may be provided in a variety of colors, such as white and black, associated with a color of the bath facility. The disposable bath mats of the present invention may be used readily at places, such as hotels, motels, spas, hospitals, and nursing homes.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present invention.

What is claimed is:

1. A disposable bath mat comprising:
a top layer composed of a biodegradable material, where the top layer includes a waterproof lining disposed on a top surface of the top layer and said biodegradable material includes a blend of paper material, a nylon material and a cotton material; and a bottom layer adhered to a bottom surface of the top layer using adhesives, wherein the bottom layer is composed of a biodegradable, slip-resistant material.

2. The disposable mat of claim 1, wherein the disposable bath is configured to assume at least one of a circular shape, an elliptical shape, and a polygon shape.

3. The disposable bath mat of claim 1, wherein the disposable bath mat comprises a length of 24 inches and a width of 24 inches.

4. The disposable bath mat of claim 2, wherein the elliptical shape comprises a length of 34 inches and a width of 15 inches.

* * * * *